(12) United States Patent
Kim et al.

(10) Patent No.: US 12,554,912 B2
(45) Date of Patent: Feb. 17, 2026

(54) STANDARD CELL AND INTEGRATED CIRCUIT INCLUDING THE SAME

(71) Applicant: SAMSUNG ELECTRONICS CO., LTD., Suwon-si (KR)

(72) Inventors: Wookyu Kim, Daegu (KR); Changbeom Kim, Hwaseong-si (KR); Taejun Yoo, Hwaseong-si (KR); Seungmin Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 741 days.

(21) Appl. No.: 17/946,761

(22) Filed: Sep. 16, 2022

(65) Prior Publication Data

US 2023/0077532 A1    Mar. 16, 2023

(30) Foreign Application Priority Data

Sep. 16, 2021  (KR) ........................ 10-2021-0124264

(51) Int. Cl.
| | | |
|---|---|---|
| *G06F 30/392* | (2020.01) | |
| *G06F 30/327* | (2020.01) | |
| *G06F 30/394* | (2020.01) | |

(52) U.S. Cl.
CPC .......... *G06F 30/392* (2020.01); *G06F 30/327* (2020.01); *G06F 30/394* (2020.01)

(58) Field of Classification Search
CPC .... G06F 30/392; G06F 30/327; G06F 30/394; H10D 84/85; H10D 84/975; H10D 89/10; H10D 84/907

(Continued)

(56) References Cited

U.S. PATENT DOCUMENTS

| | | |
|---|---|---|
| 6,885,045 B2 | 4/2005 | Hidaka |
| 8,357,955 B2 | 1/2013 | Tanaka |

(Continued)

FOREIGN PATENT DOCUMENTS

| | | |
|---|---|---|
| KR | 10-2008-0097100 A | 11/2008 |
| KR | 10-2017-0124027 A | 11/2017 |

(Continued)

OTHER PUBLICATIONS

Office Action issued Sep. 29, 2025 by the Korean Patent Office for KR Patent Application No. 10-2021-0124264.

*Primary Examiner* — Paul Dinh
(74) *Attorney, Agent, or Firm* — Sughrue Mion, PLLC

(57) ABSTRACT

A standard cell and an integrated circuit including the same are is provided. The standard cell is provided in first and second rows. The standard cell includes: a first circuit region provided in the first row and including a plurality of first transistors; a second circuit region provided in the second row and including a plurality of second transistors; a first input pin provided in the first circuit region and configured to receive a first input signal; and a second input pin provided in the second circuit region and configured to receive a second input signal. The first input signal is input to gate terminals of each of the plurality of first transistors, and the second input signal is input to gate terminals of each of the plurality of second transistors. The first circuit region is symmetric with respect to a second horizontal direction and the second circuit region is symmetric with respect to the second horizontal direction.

20 Claims, 14 Drawing Sheets

(58) Field of Classification Search
USPC .......................................................... 716/119
See application file for complete search history.

(56) References Cited

U.S. PATENT DOCUMENTS

| | | | |
|---|---|---|---|
| 9,641,161 | B1 | 5/2017 | Liu et al. |
| 10,163,880 | B2 | 12/2018 | Lin et al. |
| 10,177,166 | B2 | 1/2019 | Kang et al. |
| 10,396,063 | B2 | 8/2019 | Chang et al. |
| 10,503,859 | B2 | 12/2019 | Pelloie |
| 10,957,683 | B2 | 3/2021 | Lee et al. |
| 2014/0015059 | A1* | 1/2014 | Kouda ................. H10D 84/016 257/368 |
| 2015/0263039 | A1* | 9/2015 | Singh ................... H10D 84/907 257/206 |
| 2021/0044283 | A1 | 2/2021 | Ryu et al. |

FOREIGN PATENT DOCUMENTS

| | | |
|---|---|---|
| KR | 10-2020-0000710 A | 1/2020 |
| KR | 10-2020-0002001 A | 1/2020 |

* cited by examiner

STANDARD CELL AND INTEGRATED CIRCUIT INCLUDING THE SAME

CROSS-REFERENCE TO RELATED APPLICATION

This application claims priority to Korean Patent Application No. 10-2021-0124264, filed on Sep. 16, 2021, in the Korean Intellectual Property Office, the disclosure of which is incorporated by reference herein in its entirety.

BACKGROUND

The present disclosure relates to a standard cell, and more particularly, to a multi-height standard cell and an integrated circuit (IC) including the same.

Integrated circuits (ICs) may be designed based on standard cells. More specifically, the standard cells may be arranged according to data that defines the IC, and the arranged standard cells may be routed to generate a layout of the IC. A height of each of the standard cells may be variously determined, and a standard cell with a height that matches a multiple of a height of a row may be referred to as a multi-height standard cell.

SUMMARY

The present disclosure relates to a multi-height standard cell and an integrated circuit (IC) including the same, in which routing operation with another standard cell is easily performed.

According to an aspect of an example embodiment, a standard cell is provided in a first row and a second row, each extending in a first horizontal direction. The standard cell includes: a first circuit region provided in the first row and including a plurality of first transistors; a second circuit region provided in the second row and including a plurality of second transistors; a first input pin provided in the first circuit region and configured to receive a first input signal; and a second input pin provided in the second circuit region and configured to receive a second input signal. The first input signal is input to gate terminals of each of the plurality of first transistors, and the second input signal is input to gate terminals of each of the plurality of second transistors. The first circuit region is symmetric with respect to a second horizontal direction and the second circuit region is symmetric with respect to the second horizontal direction.

According to aspect of an example embodiment, a standard cell is provided in a first row and a second row that each extend in a first horizontal direction, the standard cell includes: a first circuit region provided in the first row and including a first function circuit formed therein, the first function circuit operating according to a first input signal; a second circuit region provided in the second row and including a second function circuit formed therein, the second function circuit operating according to a second input signal; a first input pin provided in the first circuit region and configured to receive the first input signal; and a second input pin provided in the second circuit region and configured to receive the second input signal. The first input pin and the second input pin are formed in a first metal layer closest to the first circuit region and the second circuit region, among a plurality of metal layers. The first circuit region is symmetric with respect to a second horizontal direction and the second circuit region is symmetric with respect to the second horizontal direction.

According to an aspect of an example embodiment, an integrated circuit (IC) includes a plurality of standard cells provided in a plurality of rows extending in a first horizontal direction. At least one standard cell among the plurality of standard cells includes: a first circuit region provided in a first row of the plurality of rows and including a plurality of first transistors; a second circuit region provided in a second row of the plurality of rows and including a plurality of second transistors; a first input pin provided in the first circuit region and configured to receive a first input signal; and a second input pin provided in the second circuit region and configured to receive a second input signal. The first input signal is applied to gate terminals of each of the plurality of first transistors, and the second input signal is applied to gate terminals of each of the plurality of second transistors. The first circuit region is symmetric with respect to a second horizontal direction and the second circuit region is symmetric with respect to the second horizontal direction.

BRIEF DESCRIPTION OF THE DRAWINGS

The drawings appended herein may not be to scale for the convenience of the illustration, and may show components by exaggerating or reducing the components.

The above and other aspects will be more apparent from the following description of example embodiments taken in conjunction with the accompanying drawings, in which.

DETAILED DESCRIPTION

Hereinafter, example embodiments will be described with reference to the accompanying drawings.

Figure 1:
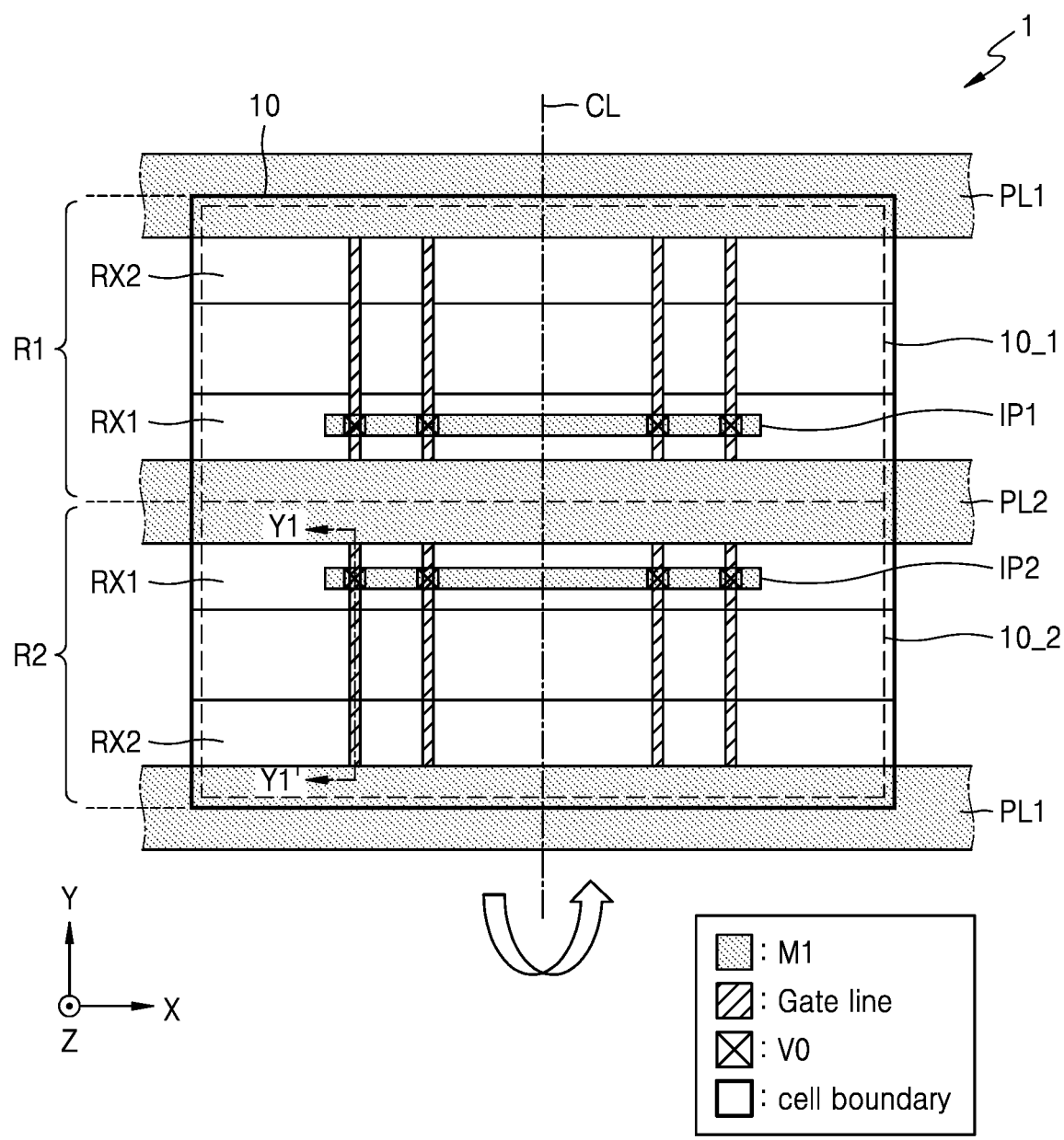
FIG. 1 is a plan view showing a layout of an integrated circuit (IC) including a standard cell, according to an example embodiment.
Figure 2:
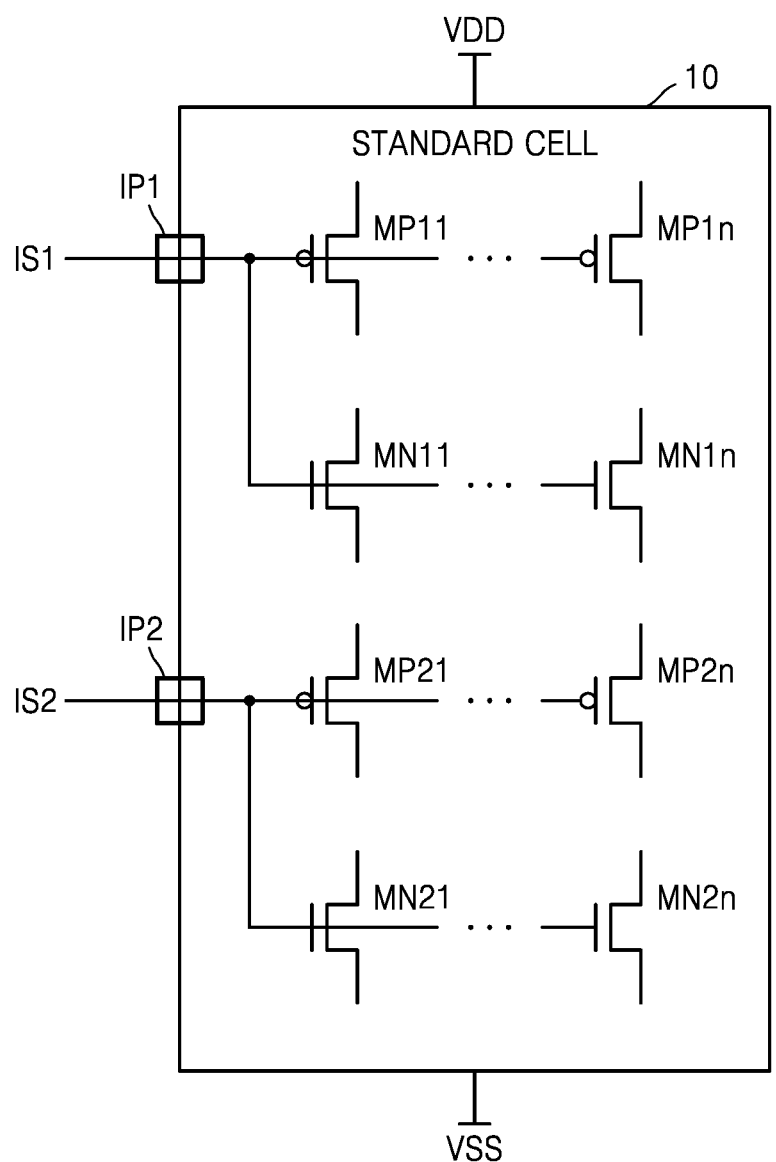
FIG. 2 is a block diagram of a standard cell according to an example embodiment.

FIG. 1 is a plan view showing a layout of an IC including a standard cell, according to an example embodiment. FIG. 2 is a block diagram of a standard cell according to an example embodiment.

FIG. 1 is a plan view showing a standard cell 10 included in an IC 1 forming one chip or one functional block on a plane formed by an X axis and a Y axis. Herein, an X-axis direction and a Y-axis direction may be referred to as a first horizontal direction and a second horizontal direction, respectively, and a Z-axis direction may be referred to as a vertical direction. The plane formed by the X axis and the Y axis may be referred to as a horizontal plane, components arranged in a +Z-axis direction relative to other components may be referred to as being located on the other components, and components arranged in a −Z-axis direction relative to other components may be referred to as being located under the other components.

Referring to FIG. 1, the standard cell 10, which is a unit of a layout included in an IC, defined by a cell boundary, may be designed to perform a predefined function and may be referred to as a cell. The IC 1 may include a plurality of various standard cells that may be aligned and arranged along a plurality of rows extending in the X-axis direction.

The standard cell 10 may be designed according to a manufacturing technique and stored in a standard cell library, and the standard cells stored in the standard cell library may be arranged and interconnected according to a design rule, such that the IC 1 is designed.

For example, the standard cell 10 may be a function cell, and may include various basic circuits, such as an inverter, an AND gate, a NAND gate, an OR gate, an XOR gate, and a NOR gate, frequently used in digital circuit designing for electronic devices, such as designing of a central processing unit (CPU), a graphic processing unit (GPU), and a system-on-chip (SOC). Alternatively, for example, the standard cell 10 may include other circuits frequently used in a circuit block, such as a flip-flop, a latch, etc.

The IC 1 may include a filler cell. The filler cell may be arranged adjacent to a function cell to provide routing of signals provided to the function cell or output from the function cell. The filler cell may be a cell used to fill the remaining space after arrangement of function cells.

The IC 1 may include a plurality of metal layers in which wirings for interconnecting the standard cells are formed. The metal layers may be formed to be stacked in the Z-axis direction, and a first metal layer M1 among a plurality of metal layers may be a metal layer arranged at the bottom. For example, a second metal layer (e.g., M2 of FIG. 4B) may be formed on the first metal layer M1. In an example embodiment, the first metal layer M1 may include patterns extending in the X-axis direction, and the second metal layer may include patterns extending in the Y-axis direction (uni-direction), without being limited thereto. The third metal layer may be further formed on the second metal layer M2.

In a boundary of each of a plurality of rows of the IC 1, e.g., the first row R1 and the second row R2, a first power line PL1 and a second power line PL2 may be formed to supply a voltage to respective standard cells. The first power line PL1 and the second power line PL2 may be formed as a conductive pattern extending in the X-axis direction and may be arranged alternately in the Y-axis direction. While it is shown in FIG. 1 that each of the first power line PL1 and the second power line PL2 is formed as a pattern of the first metal layer M1, the IC 1 is not limited thereto, and each of the first power line PL1 and the second power line PL2 may be formed as a pattern of the second metal layer M2, or may be formed inside a separation trench formed on a substrate.

Throughout the drawings, some layers may be shown for convenience of illustration, and a via, e.g., a first via V0 connecting the first metal layer M1 and a lower pattern with respect to the first metal layer M1 may be shown even when the first via V0 is located under a pattern of the first metal layer M1 to indicate connection between the pattern of the first metal layer M1 and the lower pattern.

The standard cell 10 may be a multi-height standard cell continuously arranged on two or more rows. For example, the standard cell 10 may be continuously arranged on the first row R1 and the second row R2. In this case, a Y-axis direction height of the first row R1 and a Y-axis direction height of the second row R2 may be equal to each other. However, the standard cell 10 is not limited thereto, and the Y-axis direction height of the first row R1 and the Y-axis direction height of the second row R2 may be different from each other.

The standard cell 10 may include active regions, e.g., a first active region RX1 and a second active region RX2, and gate lines. Each of the first active region RX1 and the second active region RX2 may extend in the X-axis direction, and an active pattern formed in each of the first active region RX1 and the second active region RX2 may form a transistor by intersecting a gate line extending in the Y-axis direction.

The standard cell 10 may include a first circuit region 10_1 arranged in the first row R1 and a second circuit region 10_2 arranged in the second row R2. A different input signal may be input to each of the first circuit region 10_1 and the second circuit region 10_2. In an example embodiment, gate lines of the first circuit region 10_1 may be formed in the first row R1, and gate lines of the second circuit region 10_2 may be formed in the second row R2. That is, each of the gate lines of the first circuit region 10_1 and the gate lines of the second circuit region 10_2 may be formed as a gate pattern extending in one row, and the gate lines of the first circuit region 10_1 and the gate lines of the second circuit region 10_2 may be separated from one another.

Each of the first circuit region 10_1 and the second circuit region 10_2 may be formed to be symmetric in the Y-axis direction. For example, each of the first circuit region 10_1 and the second circuit region 10_2 may be formed to be symmetric with respect to a center line CL that passes through the center of the standard cell 10 and extends in the Y-axis direction.

Referring to FIGS. 1 and 2, a first function unit for processing a first input signal IS1 may be formed in the first circuit region 10_1. In the first circuit region 10_1, a plurality of first transistors MP11 to MP1$n$ and MN11 to MN1$n$ may be formed and a first input pin IP1 to which the first input signal IS1 is input may be formed. The plurality of first transistors MP11 to MP1$n$ and MN11 to MN1$n$ may include a first P-type transistors MP11-MP1$n$ formed by the first active region RX1 and the gate lines, and a first N-type transistors MN11 to MN1$n$ formed by the second active region RX2 and the gate lines.

The first input signal IS1 may be input to a gate terminal of the plurality of first transistors MP11 to MP1$n$ and MN11 to MN1$n$, and may control a switching operation of each of the plurality of first transistors MP11 to MP1$n$ and MN11 to MN1$n$. The first input pin IP1 may be formed in the first metal layer M1 closest to the first circuit region 10_1 among a plurality of metal layers, which is the bottom layer among the plurality of metal layers, and may be electrically connected to gate lines of the first circuit region 10_1 through the first vias V0.

A second function unit for processing a second input signal IS2 may be formed in the second circuit region 10_2. In the second circuit region 10_2, a plurality of second transistors MP21 to MP2$n$ and MN21 to MN2$n$ may be formed and a second input pin IP2 to which the second input signal IS2 is input may be formed. The plurality of second transistors MP21 to MP2$n$ and MN21 to MN2$n$ may include a second P-type transistors MP21-MP2$n$ formed by the first active region RX1 and the gate lines, and a second N-type transistors MN21 to MN2n formed by the second active region RX2 and the gate lines.

The second input signal IS2 may be input to a gate terminal of the plurality of second transistors MP21 to MP2n and MN21 to MN2n, and control a switching operation of each of the plurality of second transistors MP21 to MP2n and MN21 to MN2n. The second input pin IP2 may be formed in the first metal layer M1 closest to the second circuit region 10_2 among a plurality of metal layers, which is the bottom layer among the plurality of metal layers, and may be electrically connected to gate lines of the second circuit region 10_2 through the first vias V0.

In this case, n may be a natural number greater than or equal to 2. For example, n may be an even number. A circuit implemented in the standard cell 10 according to the number of transistors, n, driven with the same input signal may be referred to as an n-driver circuit. As n increases, the performance of a circuit implemented in the standard cell 10 may be improved, power consumption may increase, and the area of the standard cell 10 may increase.

The first power line PL1 may provide a first supply voltage (e.g., a ground voltage VSS) to the standard cell 10, and the second power line PL2 may provide a second supply voltage (e.g., a power voltage VDD) to each standard cell. However, the IC 1 is not be limited thereto, and the first power line PL1 may supply the power voltage VDD and the second power line PL2 may supply the ground voltage VSS, and N-type transistors may be formed in the first active region RX1 and P-type transistors may be formed in the second active region RX2.

The standard cell 10 may be a multi-height standard cell arranged in the first row R1 and the second row R2, in which the input pin IP1 may be formed in the first metal layer M1. The use of a metal layer inside the standard cell 10 may be relatively reduced, and a routing space for interconnecting the standard cell 10 with another standard cell may be secured as the first metal layer M1 and upper layers with respect to the first metal layer M1 and routing may be optimized. The operating performance of the standard cell 10 may be improved.

Figure 3A:
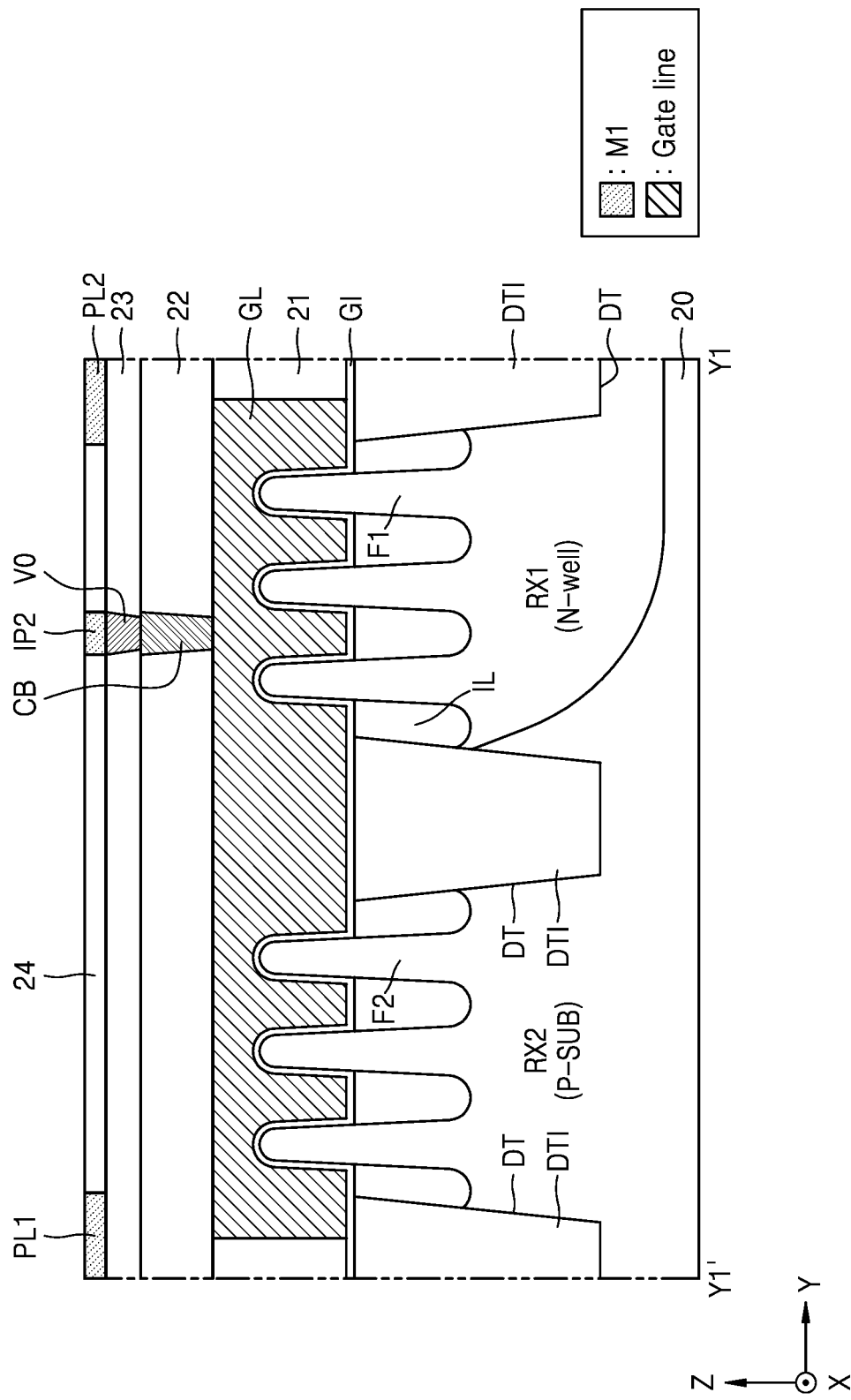
FIGS. 3A and 3B are cross-sectional views showing an example of a standard cell structure of an IC according to an example embodiment.
Figure 3B:
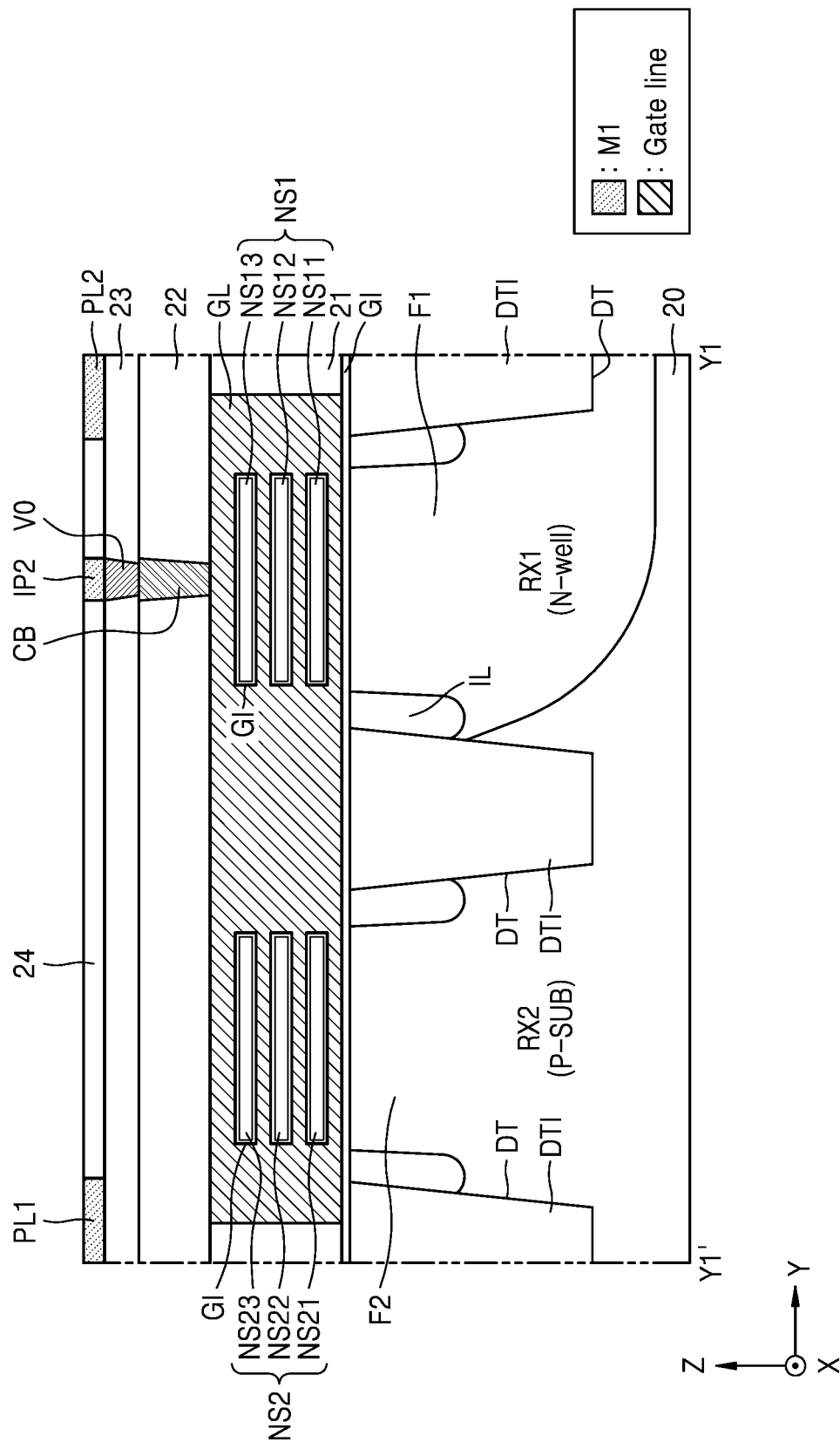

FIGS. 3A and 3B are cross-sectional views showing an example of a standard cell structure of an IC according to an example embodiment. FIGS. 3A and 3B are cross-sectional views taken along a line Y1-Y1' of FIG. 1. A gate spacer may be formed on a side of a gate line and a barrier layer may be formed on the surface of a contact and/or a via.

FIG. 3A shows an example where a plurality of fins are formed in an active region, and FIG. 3B shows an example where a nanosheet is formed in the active region. A standard cell included in an integrated circuit may have various structures including those illustrated in FIGS. 3A and 3B. For example, in the standard cell, a gate-all-around (GAA) FET in which a nanowire formed on an active region is surrounded by a gate line may be formed, and a vertical GAA FET in which a plurality of nanowires may be vertically stacked on the active region and the plurality of nanowires are surrounded by the gate line may be formed. For example, a multi-bridge channel (MBC) FET in which a plurality of nanosheets may be stacked on the active region and a gate line surrounds the plurality of nanosheets may be formed in the standard cell. Moreover, for example, a negative capacitance (NC) FET may be formed in the active region. In addition to the above-described example of the transistor, various transistors (a complementary FET, a negative FET, a carbon nanotube (CNT) FET, a bipolar junction transistor, and other three-dimensional transistors) may be formed in the gate line and the active region.

Referring to FIG. 3A, a substrate 20 may include element semiconductor such as silicon (Si) or germanium (Ge), or a III-V-group compound such as GaAs, AlGaAs, InAs, InGaAs, InSb, GaSb, InGaSb, InP, GaP, InGaP, InN, GaN, InGaN, etc. According to an example embodiment, the substrate 20 may be a silicon-on-insulator (SDI) substrate or a germanium-on-insulator (GOI) substrate. In an example embodiment, the substrate 20 may be doped with a P-type impurity.

In the substrate 20, the first active region RX1 and the second active region RX2 may be formed. In an example embodiment, the second active region RX2 may be formed on the substrate 20 P-SUB doped with the P-type impurity, and the first active region RX1 may be formed in an N well formed in the substrate 20. The first active region RX1 may form the P-type transistor with the gate line GL, and the second active region RX2 may form the N-type transistor with the gate line GL.

An isolation trench DT may be formed between the first active region RX1 and the second active region RX2. An insulating material (e.g., an oxide) may be provided in the isolation trench DT, thus forming an element isolating layer DTI. The first active region RX1 and the second active region RX2 may be separated from each other by the element isolating layer DTI. Under the first power line PL1 and the second power line PL2, the isolation trench DT may be formed and the element isolating layer DTI may be formed.

A plurality of first fins F1 and a plurality of second fins F2 may extend in the X-axis direction in parallel to one another, and may be spaced apart from one another along the Y-axis direction. An element insulating film IL (e.g., an oxide) may be formed between each of the plurality of first fins F1 and between the plurality of second fins F2. In the first active region (RX1) and the second active region RX2, the plurality of first fins F1 and the plurality of second fins F2 may protrude upward from the element insulating film IL in a fin shape. Although it is shown in FIG. 3A that three first fins F1 and three second fins F2 are formed, the number of fin formed in the first active region RX1 and the second active region RX2 may be variously changed without being limited thereto.

A gate insulating film GI and the gate line GL may be formed to extend in the Y-axis direction. The gate insulating film GI and the gate line GL may cover a top surface and both sidewalls of each of the plurality of first fins F1 and the plurality of second fins F2, a top surface of the element insulating film IL, and a top surface of the element isolating layer DTI. The gate line GL, the first active region RX1, and the second active region RX2 may be formed through a front-end-of-line (FEOL) process.

First to fourth interlayer insulating films 21 to 24 may be formed on the plurality of first fins F1 and the plurality of second fins F2. An active contact and an active via that connect a source/drain region with the pattern of the first metal layer M1 through the first interlayer insulating film 21 may be formed.

A gate contact CB may be connected to the gate line GL through a second interlayer insulating layer 22, and a first via (herein, also referred to as gate via) V0 may connect the gate contact CB with the second input pin IP2 through a third interlayer insulating film 23. The second input pin IP2 may be formed as the pattern of the first metal layer M1, and the gate via V0 may be formed as a first via electrically connected under the first metal layer M1. The second input pin IP2 may contact the gate via V0. Thus, the second input pin IP2 may be electrically connected to the gate line GL through the gate via V0 and the gate contact CB.

The active contact, the active via, the gate contact CB, and the gate via V0 may be formed through a middle-of-line (MOL) process. The plurality of metal layers including the first metal layer M1 may be formed through a back-end-of-line (BEOL) process.

Referring to FIG. 3B, in an example embodiment, a nanosheet, which is an active region, may be formed on each of the first active region RX1 and the second active region RX2. A first nanosheet stack NS1 may be formed on the first active region RX1, and a second nanosheet stack NS2 may be formed on the second active region RX2. Nanosheets of each of the first nanosheet stack NS1 and the second nanosheet stack NS2 may extend in (i.e., be stacked in) the X-axis direction, and be stacked in the Z-axis direction.

The first nanosheet stack NS1 and the second nanosheet stack NS2 may function as a channel of a transistor. For example, the first nanosheet stack NS1 may be doped with an N-type impurity and form a P-type transistor. On the other hand, the second nanosheet stack NS2 may be doped with a P-type impurity and form an N-type transistor. In an example embodiment, the first nanosheet stack NS1 and the second nanosheet stack NS2 may be formed of Si, Ge, or SiGe. In an example embodiment, the first nanosheet stack NS1 and the second nanosheet stack NS2 may be formed of InGaAs, InAs, GaSb, InSb, or a combination thereof.

The first nanosheet stack NS1 and the second nanosheet stack NS2 may respectively include a plurality of nanosheets NS11 to NS13 and a plurality of nanosheets NS21 to NS23 that mutually overlap in a vertical direction (the Z-axis direction) on top surfaces of the first fins F1 and the second fins F2. In the current example, the first nanosheet stack NS1 and the second nanosheet stack NS2 respectively include three nanosheets, but example embodiments are not limited thereto. For example, each of the first nanosheet stack NS1 and the second nanosheet stack NS2 includes at least two nanosheets, and the number of nanosheets is not specially limited.

The gate line GL may surround each of the plurality of nanosheets NS11 to NS13 and NS21 to NS23 while covering the first nanosheet stack NS1 and the second nanosheet stack NS2 on the first fin F1 and the second fin F2. The plurality of nanosheets NS11 to NS13 and NS21 to NS23 may have a GAA structure surrounded by the gate line GL. The gate insulating film GI may be interposed between the first nanosheet stack NS1 and the second nanosheet stack NS2 and the gate line GL.

Figure 4A:
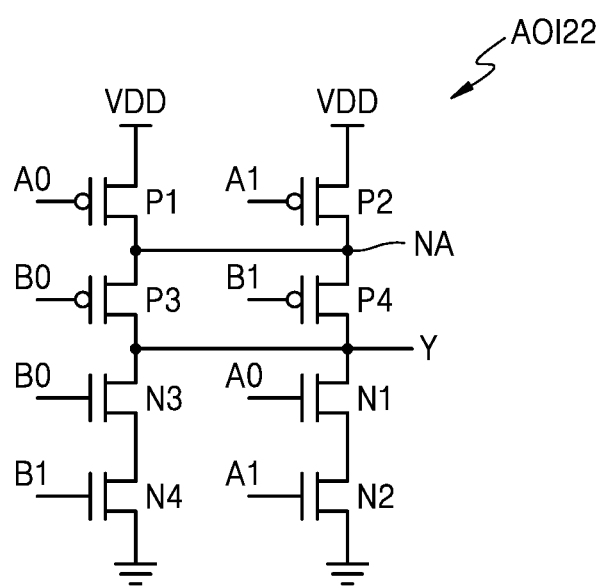
FIG. 4A is a circuit diagram of a logic gate included in an IC according to an example embodiment.
Figure 4B:
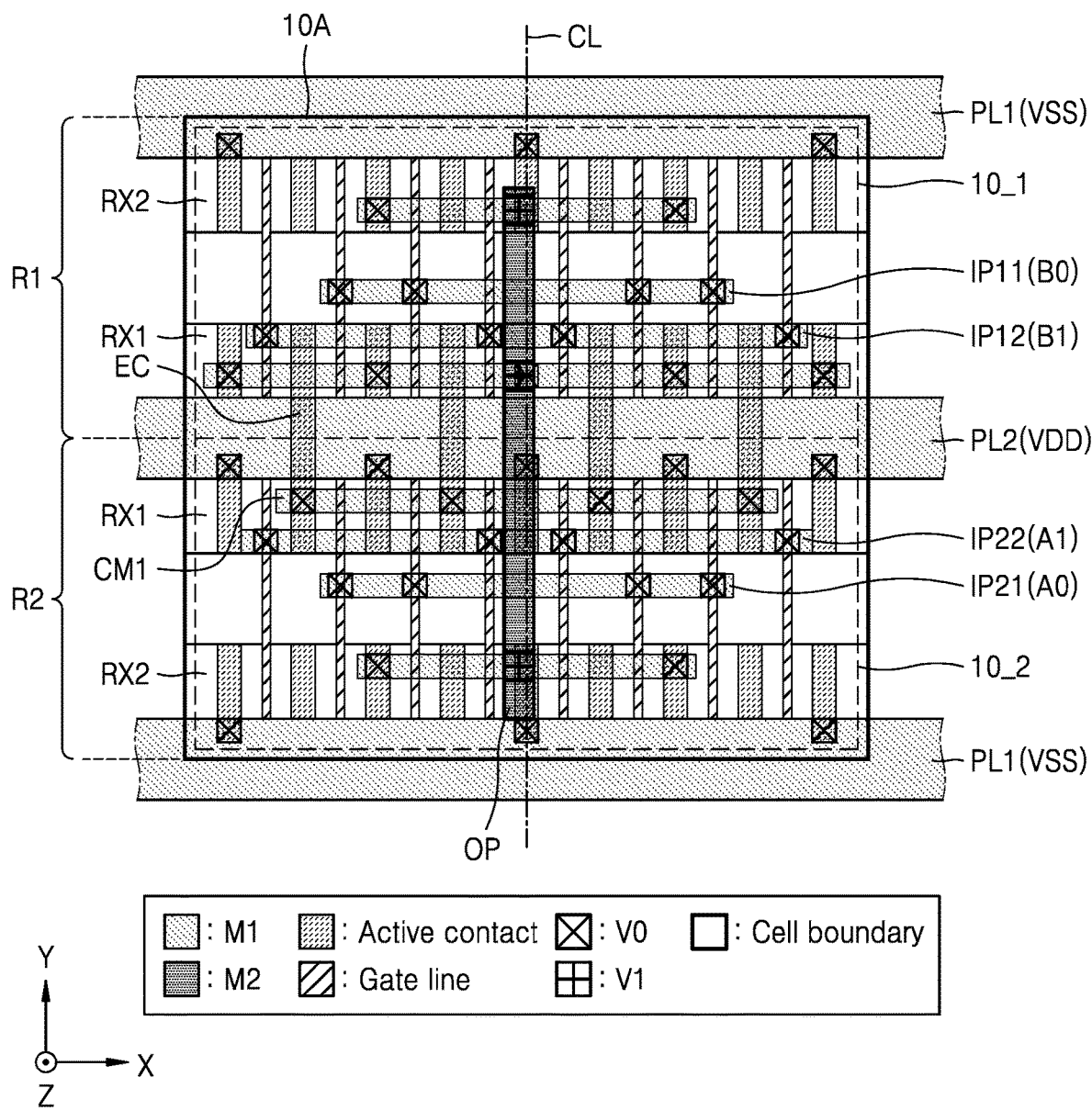
FIG. 4B shows a layout of a standard cell according to an example embodiment.

FIG. 4A shows an example of a circuit diagram of a logic gate included in an IC according to an example embodiment, and FIG. 4B shows an example of a layout of a standard cell according to an example embodiment. FIG. 4B shows a layout of standard cells in which a 2-2 AND-OR-inverter (AOI22) circuit is implemented as a logic gate, which is an example of the standard cell 10 described with reference to FIG. 1. FIG. 4A is a circuit diagram of the AOI22 circuit, and FIG. 4B schematically shows layouts of a standard cell 10A corresponding to the AOI22 on the plane formed of the X axis and the Y axis. FIG. 4B shows an example of a layout in which a 4-driver circuit is implemented.

Referring to FIGS. 4A and 4B, first to fourth input signals A0, A1, B0, and B1 may be input to and an output signal Y may be output from the AOI22 circuit. The AOI22 circuit may include first to fourth P-type transistor units P1 to P4 to which the first to fourth input signals A0, A1, B0, and B1 are input, respectively, and first to fourth N-type transistor units N1 to N4 to which the first to fourth input signals A0, A1, B0, and B1 are input, respectively. Although each of the first to fourth P-type transistor unit P1 to P4 and the first to fourth N-type transistor units N1 to N4 is illustrated as one transistor in FIG. 4A, this is for convenience of illustration, and example embodiments are not limited thereto. For example, each of the first to fourth P-type transistor units P1 to P4 may include first to $n^{th}$ P-type transistors (e.g., MP11 to MP1$n$ or MP21 to MP2$n$ of FIG. 2) connected in parallel, and each of the first to fourth N-type transistor units N1 to N4 may include first to nth N-type transistors (e.g., MN11 to MN1$n$ or MN21 to MN2$n$ of FIG. 2).

According to a function of the AOI22, when at least one of the first input signal A0 and the second input signal A1 is logic low and at least one of the third input signal B0 and the fourth input signal B1 is logic low, the AOI22 circuit may output the output signal Y of logic high.

The standard cell 10A defined by a cell boundary may be a multi-height cell arranged in the first row R1 and the second row R2. The standard cell 10A may receive the ground voltage VSS from the first power line PL1, and may receive the power voltage VDD from the second power line PL2.

The standard cell 10A may include the first circuit region 10_1 arranged in the first row R1 and the second circuit region 10_2 arranged in the second row R2. The first circuit region 10_1 may be symmetric with respect to the center line CL passing through the center of the standard cell 10A and being parallel to the Y-axis direction, and the second circuit region 10_2 may be symmetric with respect to the center line CL. In this case, the symmetry may indicate that arrangements of transistors included in the first circuit region 10_1 are symmetric with respect to each other, and arrangements of transistors included in the second circuit region 10_2 are symmetric with respect to each other. That is, the symmetry may indicate that arrangements of patterns (e.g., the first active region RX1, the second active region RX2, and the gate line) formed by the FEOL process are symmetric with respect to each other, and moreover, arrangements of patterns (e.g., the gate contact, the active contact, and the first via V0) formed by the MOL process may also be symmetric with respect to each other. The patterns of the first metal layer M1 and the second metal layer M2 formed on the first circuit region 10_1 and the second circuit region 10_2 may be or may not be symmetric with respect to the center line CL.

The standard cell 10A may include first to fourth input pins IP21, IP22, IP11, and IP12 to which the first to fourth input signals A0, A1, B0, and B1 are input, and an output pin OP from which the output signal Y is output. The third input pin IP11 to which the third input signal B0 is input and the fourth input pin IP12 to which the fourth input signal B1 is input may be formed in the first circuit region 10_1, and the first input pin IP21 to which the first input signal A0 is input and the second input pin IP22 to which the second input signal A1 is input may be formed in the second circuit region 10_2. In the standard cell 10A, a 4-driver circuit may be implemented, and each of the first to fourth input pins IP21, IP22, IP11, and IP12 may contact four first vias V0 and may be connected to four gate lines.

The third and fourth P-type transistor units P3 and P4 and the third and fourth N-type transistor units N3 and N4 may be formed in the first circuit region 10_1, and the first and second P-type transistor units P1 and P2 and the first and second N-type transistor units N1 and N2 may be formed in the second circuit region 10_2. In the standard cell 10A, each of the first to fourth P-type transistor units P1 to P4 and the first to fourth N-type transistor units N1 to N4 may be formed to include four transistors that are connected in parallel. For example, a function unit for performing a NAND operation on the third and fourth input signals B0 and B1 may be formed in the first circuit region 10_1, and a function unit for performing a NAND operation on the first and second input signals A0 and A1 may be formed in the second circuit region 10_2.

In an example embodiment, the first to fourth input pins IP21, IP22, IP11, and IP12 may be formed in the first metal layer M1, and the output pin OP may be formed in the second metal layer M2. In addition, to electrically connect internal components of the standard cell 10A, that is, for internal routing, the standard cell 10A may include patterns formed in the first metal layer M1 or the second metal layer M2.

A plurality of M1 tracks in which the patterns of the first metal layer M1 are arranged may be formed in the standard cell 10A. In each of the plurality of M1 tracks, a conductive pattern extending in the X-axis direction may be formed. The plurality of M1 tracks may be separated from one another in the Y-axis direction. The patterns of the first metal layer M1 formed in the standard cell 10A according to an example embodiment may be formed as a single pattern in a corresponding track among the plurality of M1 tracks. That is, M1 cut may not be formed in the standard cell 10A. Thus, a routing space for electrically connecting the standard cell 10A with another standard cell may be secured, and a routing operation may be easy to perform.

The patterns formed in the first metal layer M1 and the second metal layer M2 may be formed of metal, a conductive metal nitride, a metal silicide, or a combination thereof. For example, the patterns formed in the first metal layer M1 and the second metal layer M2 may include a conductive material such as tungsten (W), molybdenum (Mo), titanium (Ti), cobalt (Co), tantalum (Ta), nickel (Ni), tungsten silicide, titanium silicide, cobalt silicide, tantalum silicide, nickel silicide, etc.

The standard cell 10A may include the first vias V0 that electrically connect the first active region RX1, the second active region RX2, and the gate line to the patterns of the first metal layer M1. The standard cell 10A may include second vias V1 that connect the first metal layer M1 with the second metal layer M2 between the first metal layer M1 and the second metal layer M2.

Each of the first circuit region 10_1 and the second circuit region 10_2 may include the first active region RX1 and the second active region RX2. Each of the first active region RX1 and the second active region RX2 may extend in the X-axis direction. A P-type transistor may be formed in the first active region RX1, and an N-type transistor may be formed in the second active region RX2.

As described with reference to FIGS. 3A and 3B, on the first active region RX1 and the second active region RX2, at least one fin extending in the X-axis direction may be formed, or a nanowire or nanosheet may be formed. Thus, a gate line and an active region may form a fin FET (FinFET).

Active contacts may be formed to contact a source/drain region formed in each of the first active region RX1 and the second active region RX2. The active contacts may be formed to extend in the Y-axis direction. A node NA of the AOI22 circuit may be formed by extended active contacts EC formed across the first row R1 and the second row R2, the first vias V0 contacting the extended active contacts EC, and a pattern CM1 of the first metal layer M1 contacting the first vias V0. Thus, the first circuit region 10_1 and the second circuit region 10_2 may be electrically connected by the extended active contacts EC formed across the first row R1 and the second row R2. The pattern CM1 of the first metal layer M1, which implements the node NA of the AOI22 circuit, rather than an output node from which the output signal Y is output, may be formed in one (e.g., the second circuit region 10_2 in FIG. 4B) of the first circuit region 10_1 and the second circuit region 10_2.

The standard cell 10A may include a plurality of gate lines. The plurality of gate lines included in the standard cell 10A may extend in the Y-axis direction and may be separated from one another in the X-axis direction. Pitches between the plurality of gate lines may be identical to each other.

In an example embodiment, gate lines of the first circuit region 10_1 may be formed in the first row R1, and gate lines of the second circuit region 10_2 may be formed in the second row R2. For example, the gate lines of the first circuit region 10_1 may not extend to the second circuit region 10_2, and the gate lines of the second circuit region 10_2 may not extend to the first circuit region 10_1. That is, each of the gate lines of the first circuit region 10_1 and the gate lines of the second circuit region 10_2 may be formed as a gate pattern extending in one row, and the gate lines of the first circuit region 10_1 and the gate lines of the second circuit region 10_2 may be separated from one another.

In an example embodiment, the gate lines may include a work function metal-containing layer and a gap fill metal film. For example, the work function metal-containing layer may include at least one metal among Ti, W, Ru, Nb, Mo, Hf, Ni, Co, Pt, Yb, Tb, Dy, Er and Pd, and the gap fill metal film may be formed of a W film or an Al film. In an example embodiment, the gate lines may include a stacked structure of TiAlC/TiN/W, a stacked structure of TiN/TaN/TiAlC/TiN/W, or a stacked structure of TiN/TaN/TiN/TiAlC/TiN/W.

Figure 5:
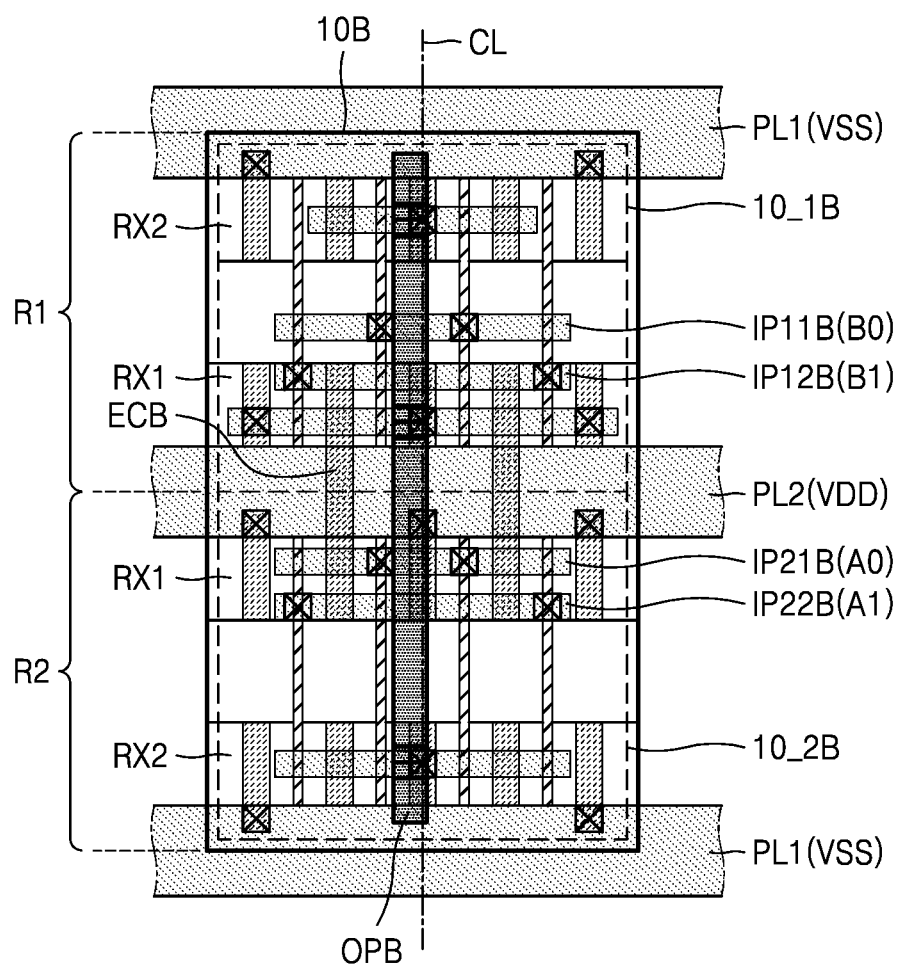
FIGS. 5 and 6 show layouts of a standard cell according to example embodiments.
Figure 6:
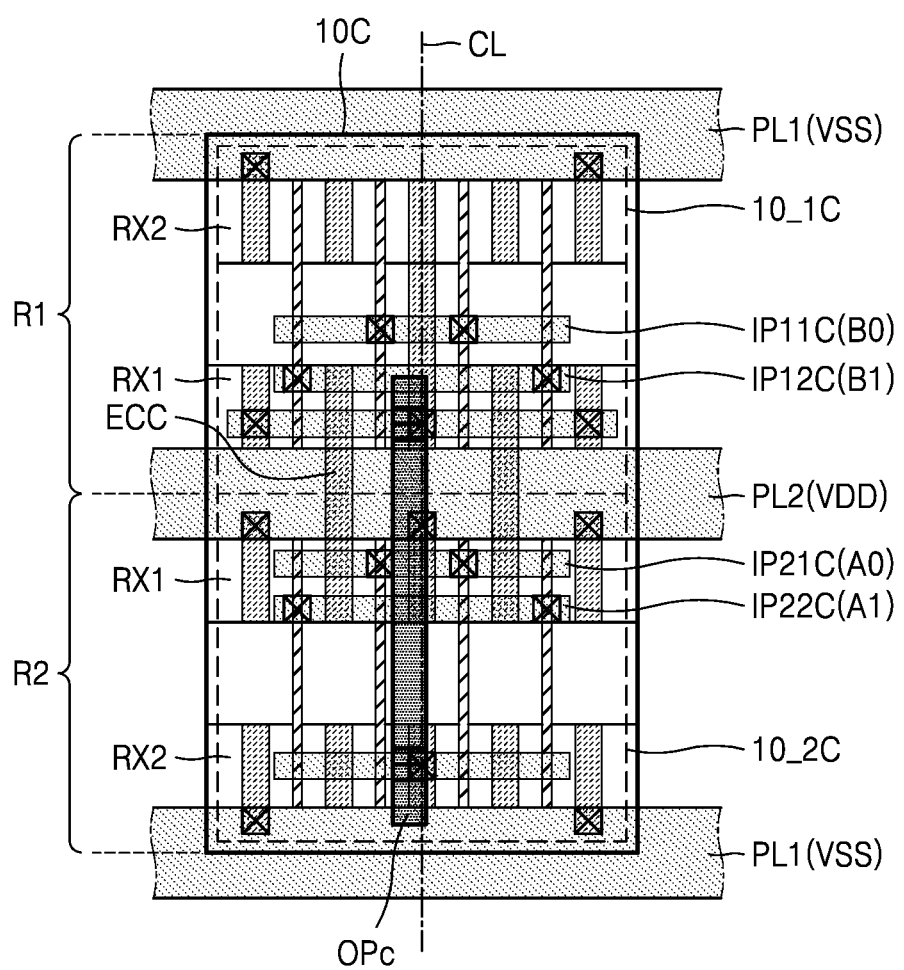

FIGS. 5 and 6 show layouts of a standard cell according to example embodiments. FIGS. 5 and 6 each show a layout of standard cells in which an AOI22 circuit is implemented, which is an example of the standard cell 10 described with reference to FIG. 1. FIGS. 5 and 6 show examples of a 2-driver circuit and will be described with reference to the circuit diagram of the AOI22 circuit of FIG. 4A.

Referring to FIG. 5, a standard cell 10B defined by a cell boundary may include a first circuit region 10_1B arranged in the first row R1 and a second circuit region 10_2B arranged in the second row R2. The third and fourth P-type transistor units P3 and P4 and the third and fourth N-type transistor units N3 and N4 may be formed in the first circuit region 10_1B, and the first and second P-type transistor units P1 and P2 and the first and second N-type transistor units N1 and N2 may be formed in the second circuit region 10_2B. In the standard cell 10B, each of the first to fourth P-type transistor units P1 to P4 and the first to fourth N-type transistor units N1 to N4 may be formed to include two transistors that are connected in parallel.

In an example embodiment, the first circuit region 10_1B may be symmetric with respect to the center line CL passing through the center of the standard cell 10B and being parallel to the Y-axis direction, and the second circuit region 10_2B may be symmetric with respect to the center line CL.

The standard cell 10B may include first to fourth input pins IP21B, IP22B, IP11B, and IP12B to which the first to fourth input signals A0, A1, B0, and B1 are input. The standard cell 10B may also include an output pin OPB from which the output signal Y is output. The third input pin IP11B to which the third input signal B0 is input and the fourth input pin IP12B to which the fourth input signal B1 is input may be formed in the first circuit region 10_1B, and the first input pin IP21B to which the first input signal A0 is input and the second input pin IP22B to which the second input signal A1 is input may be formed in the second circuit region 10_2B. In the standard cell 10B, a 2-driver circuit may be implemented, and each of the first to fourth input pins IP21B, IP22B, IP11B, and IP12B may contact two first vias V0 and may be connected to two gate lines.

In an example embodiment, the first to fourth input pins IP21B, IP22B, IP11B, and IP12B may be formed in the first metal layer M1. The output pin OPB may be formed in the second metal layer M2.

The node NA of the AOI22 circuit may be formed by the extended active contacts ECB formed across the first row R1 and the second row R2, and the first circuit region 10_1B and the second circuit region 10_2B may be electrically connected by the extended active contacts ECB formed across the first row R1 and the second row R2.

In an example embodiment, gate lines of the first circuit region 10_1B may be formed in the first row R1, and gate lines of the second circuit region 10_2B may be formed in the second row R2.

In an example embodiment, the patterns of the first metal layer M1 formed in the standard cell 10B may be formed as a single pattern in a corresponding track among the plurality of M1 tracks.

Referring to FIG. 6, a standard cell 10C defined by a cell boundary may include a first circuit region 10_1C arranged in the first row R1 and a second circuit region 10_2C arranged in the second row R2. The third and fourth P-type transistor units P3 and P4 and the third and fourth N-type transistor units N3 and N4 may be formed in the first circuit region 10_1C, and the first and second P-type transistor units P1 and P2 and the first and second N-type transistor units N1 and N2 may be formed in the second circuit region 10_2C. In the standard cell 10C, each of the first to fourth P-type transistor units P1 to P4 and the first to fourth N-type transistor units N1 to N4 may be formed to include two transistors that are connected in parallel.

In an example embodiment, the first circuit region 10_1C may be symmetric with respect to the center line CL passing through the center of the standard cell 10C and being parallel to the Y-axis direction, and the second circuit region 10_2C may be symmetric with respect to the center line CL.

The standard cell 10C may include first to fourth input pins IP21C, IP22C, IP11C, and IP12C to which the first to fourth input signals A0, A1, B0, and B1 are input, and an output pin OPc from which the output signal Y is output. The third input pin IP to which the third input signal B0 is input and the fourth input pin IP12C to which the fourth input signal B1 is input may be formed in the first circuit region 10_1C, and the first input pin IP21C to which the first input signal A0 is input and the second input pin IP22C to which the second input signal A1 is input may be formed in the second circuit region 10_2C. In the standard cell 10C, a 2-driver circuit may be implemented, and each of the first to fourth input pins IP21C, IP22C, IP11C, and IP12C may contact two first vias V0 and may be connected to two gate lines.

In an example embodiment, the first to fourth input pins IP21C, IP22C, IP11C, and IP12C may be formed in the first metal layer M1. The output pin OPc may be formed in the second metal layer M2.

The node NA of the AOI22 circuit may be formed by extended active contacts ECC formed across the first row R1 and the second row R2, and the first circuit region 10_1C and the second circuit region 10_2C may be electrically connected by the extended active contacts ECC formed across the first row R1 and the second row R2.

In the standard cell 10B of FIG. 5, a pattern of the second metal layer M2 extending in the Y-axis direction may be formed to electrically connect the first active region RX1 in the first circuit region 10_1B with the second active region RX2 in the first circuit region 10_1B and the second active region RX2 in the second circuit region 10_2B. On the other hand, in the standard cell 10C of FIG. 6, an active contact extending in the Y-axis direction may be formed to electrically connect the first active region RX1 in the first circuit region 10_1C with the second active region RX2 in the first circuit region 10_1C, and a pattern of the second metal layer M2 extending in the Y-axis direction may be formed to electrically connect the first active region RX1 in the first circuit region 10_1C with the second active region RX2 in the second circuit region 10_2C.

Figure 7A:
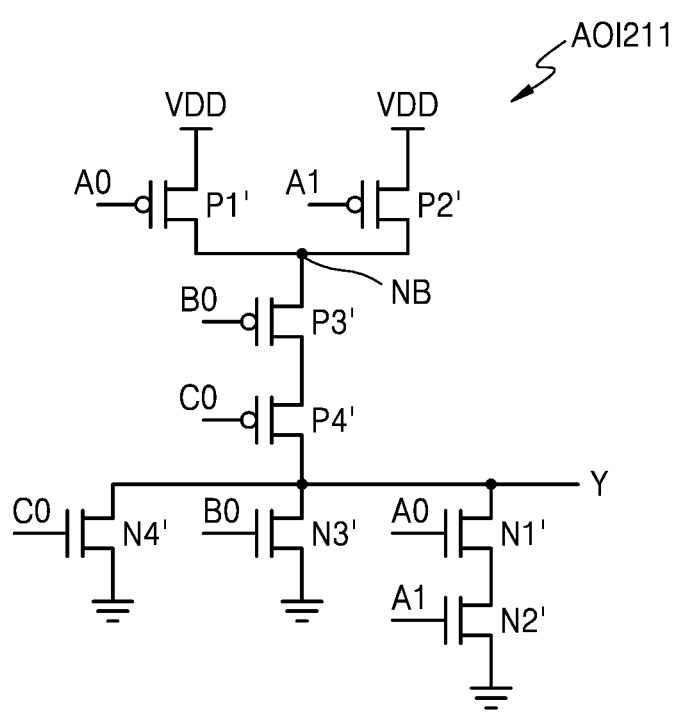
FIG. 7A is a circuit diagram of a logic gate included in an IC according to an example embodiment.
Figure 7B:
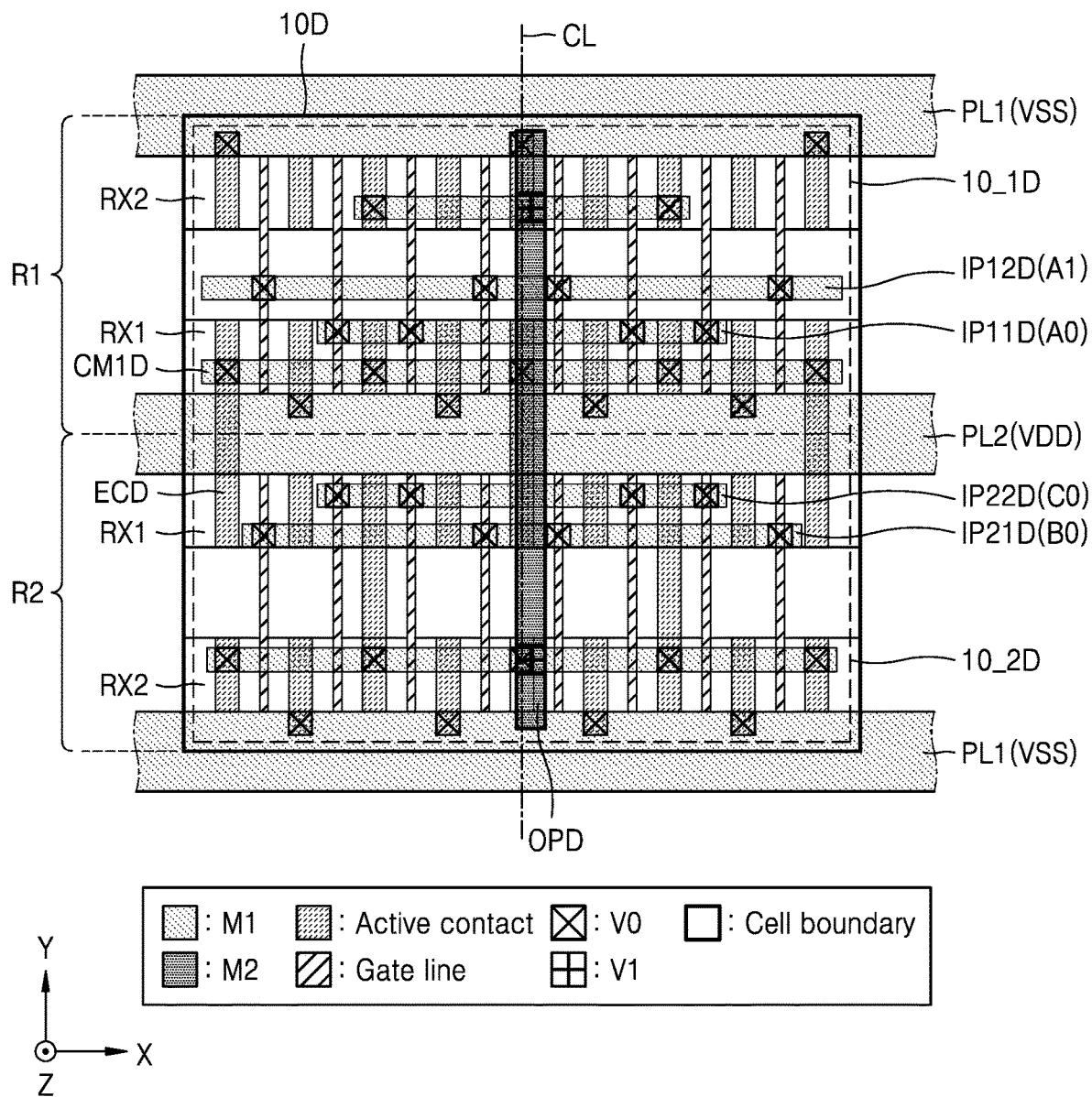
FIG. 7B shows a layout of a standard cell according to an example embodiment.

FIG. 7A shows an example of a circuit diagram of a logic gate included in an IC according to an example embodiment, and FIG. 7B shows an example of a layout of a standard cell according to an example embodiment. FIG. 7B shows a layout of standard cells in which a 2-1-1 AND-OR-inverter (AOI211) circuit is implemented as a logic gate, which is an example of the standard cell 10 described with reference to FIG. 1. FIG. 7A is a circuit diagram of the AOI211 circuit, and FIG. 7B schematically shows layouts of a standard cell 10D corresponding to the AOI211 circuit on the plane formed of the X axis and the Y axis. FIG. 7B shows an example of a layout in which a 4-driver circuit is implemented.

Referring to FIGS. 7A and 7B, the first to fourth input signals A0, A1, B0, and C0 may be input to and the output signal Y may be output from the AOI211 circuit. The AOI211 circuit may include first to fourth P-type transistor units P1' to P4' to which the first to fourth input signals A0, A1, B0, and C0 are input, respectively, and first to fourth N-type transistor units N1' to N4' to which the first to fourth input signals A0, A1, B0, and C0 are input, respectively. While it is shown in FIG. 7A that each of the first to fourth P-type transistor units P1' to P4' and the first to fourth N-type transistor units N1' to N4' is one transistor, this is for convenience of illustration, and each of the first to fourth P-type transistor units P1' to P4' and the first to fourth N-type transistor units N1' to N4' may include a plurality of transistors connected in parallel.

According to a function of the AOI211 circuit, when at least one of the first input signal A0 and the second input signal A1 is logic low, and the third input signal B0 and the fourth input signal C0 are logic low, the AOI211 circuit may output the output signal Y of logic high.

The standard cell 10D defined by a cell boundary may be a multi-height cell arranged in the first row R1 and the second row R2. The standard cell 10D may receive the ground voltage VSS from the first power line PL1, and may receive the power voltage VDD from the second power line PL2 arranged in the boundaries between the first row R1 and the second rows R2.

The standard cell 10D may include a first circuit region 10_1D arranged in the first row R1 and a second circuit region 10_2D arranged in the second row R2. The first circuit region 10_1D may be symmetric with respect to the center line CL passing through the center of the standard cell 10D and being parallel to the Y-axis direction, and the second circuit region 10_2D may be symmetric with respect to the center line CL. In this case, the symmetry may indicate that arrangements of transistors included in the first circuit region 10_1D are symmetric with respect to each other, and arrangements of transistors included in the second circuit region 10_2D are symmetric with respect to each other.

The standard cell 10D may include first to fourth input pins IP11D, IP12D, IP21D, and IP22D to which the first to fourth input signals A0, A1, B0, and C0 are input, and an output pin OPD from which the output signal Y is output. The first input pin IP11D to which the first input signal A0 is input and the second input pin IP12D to which the second input signal A1 is input may be formed in the first circuit region 10_1D, and the third input pin IP21D to which the third input signal B0 is input and the fourth input pin IP22D to which the fourth input signal C0 is input may be formed in the second circuit region 10_2D. In the standard cell 10D, a 4-driver circuit may be implemented, and each of the first to fourth input pins IP11D, IP12D, IP21D, and IP22D may contact four first vias V0 and may be connected to four gate lines.

First and second P-type transistor units P1' and P2' and first and second N-type transistor units N1' and N2' may be formed in the first circuit region 10_1D, and the third and fourth P-type transistor units P3' and P4' and the third and fourth N-type transistor units N3' and N4' may be formed in the second circuit region 10_2D. In the standard cell 10D, each of first to fourth P-type transistor units P1' to P4' and the first to fourth N-type transistor units N1' to N4' may be formed to include four transistors that are connected in parallel. For example, a function unit for performing a NAND operation on the first and second input signals A0 and A1 may be formed in the first circuit region 10_1D, and a function unit for performing a NOR operation on the third and fourth input signals B0 and C0 may be formed in the second circuit region 10_2D.

In an example embodiment, the first to fourth input pins IP11D, IP12D, IP21D, and IP22D may be formed in the first metal layer M1, and the output pin OPD may be formed in the second metal layer M2. In addition, to electrically connect internal components of the standard cell 10D, that is, for internal routing, the standard cell 10D may include patterns formed in the first metal layer M1 or the second metal layer M2.

In the standard cell 10D, a plurality of M1 tracks in which patterns of the first metal layer M1 are arranged may be formed. In each of the plurality of M1 tracks, a conductive pattern extending in the X-axis direction may be formed. The patterns of the first metal layer M1 formed in the standard cell 10D according to an example embodiment may be formed as a single pattern in a corresponding track among the plurality of M1 tracks.

A node NB of the AOI211 circuit may be formed by extended active contacts ECD formed across the first row R1 and the second row R2, the first vias V0 contacting the extended active contacts ECD, and a pattern CM1D of the first metal layer M1 contacting the first vias V0. Thus, the first circuit region 10_1D and the second circuit region 10_2D may be electrically connected by the extended active contacts ECD formed across the first row R1 and the second row R2. The pattern CM1D of the first metal layer M1, which implements the node NB of the AOI211 circuit, rather than an output node from which the output signal Y is output, may be formed in one (e.g., the first circuit region 10_D in FIG. 7B) of the first circuit region 10_1D and the second circuit region 10_2D.

In the first circuit region 10_1D and the second circuit region 10_2D, gate lines extending in the Y-axis direction may be formed. In an example embodiment, gate lines of the first circuit region 10_1D may be formed in the first row R1, and gate lines of the second circuit region 10_2D may be formed in the second row R2.

Figure 8A:
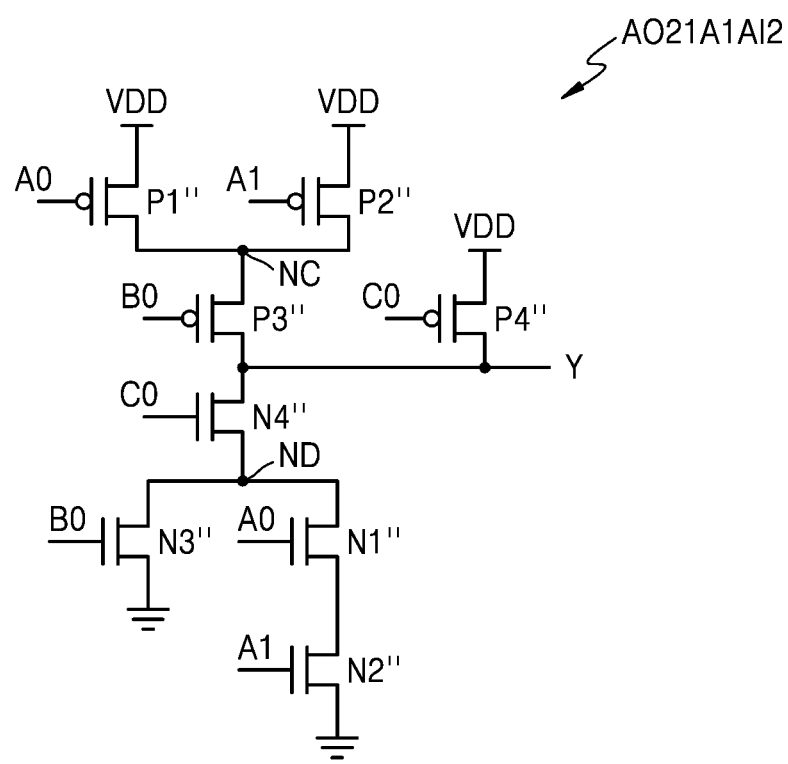
FIG. 8A is a circuit diagram of a logic gate included in an IC according to an example embodiment.
Figure 8B:
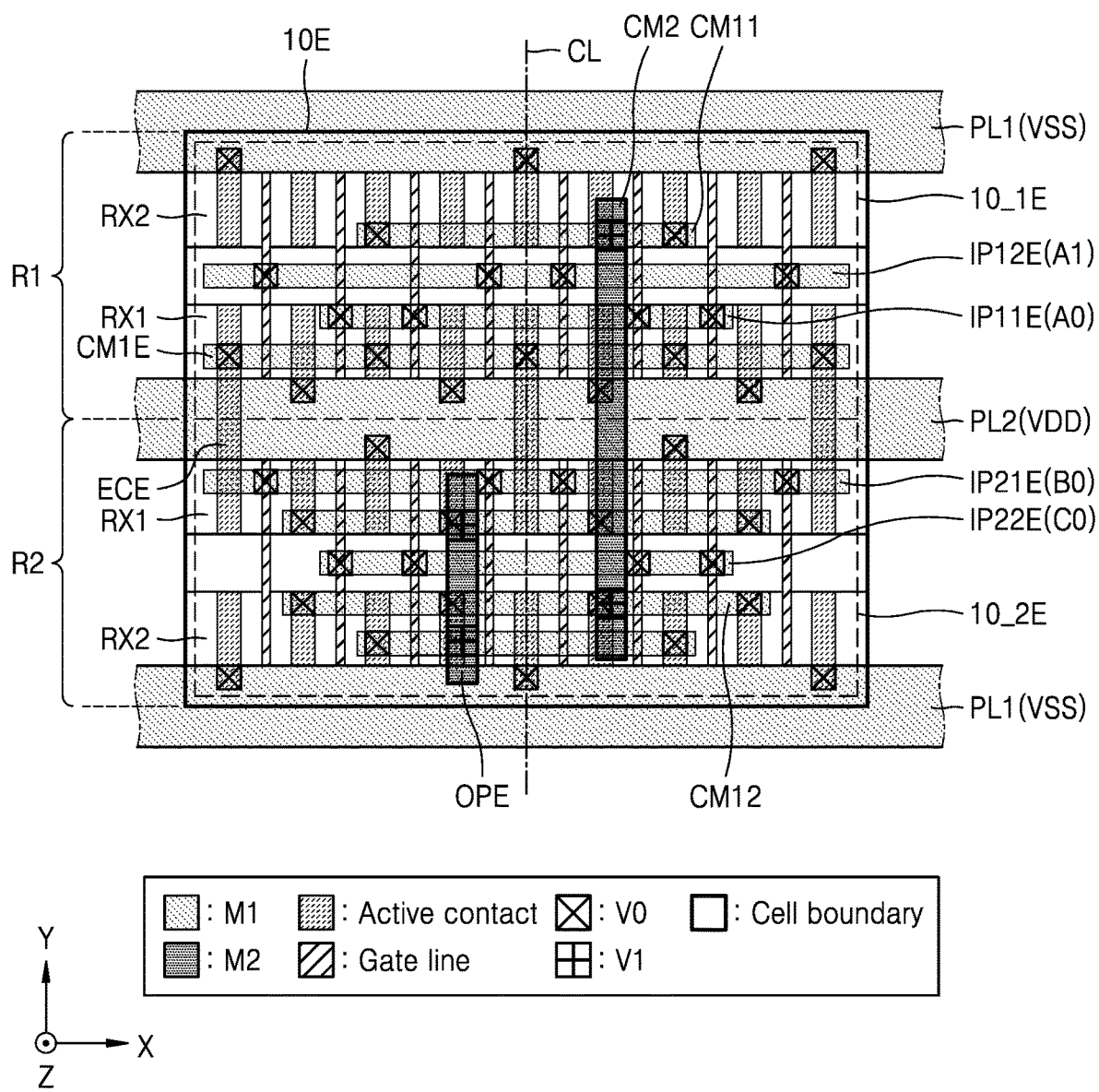
FIG. 8B shows a layout of a standard cell according to an example embodiment.

FIG. 8A shows an example of a circuit diagram of a logic gate included in an IC according to an example embodiment, and FIG. 8B shows an example of a layout of a standard cell according to an example embodiment. FIG. 8B shows a layout of standard cells in which an AO21A1AI2 circuit including an AND-OR-AND inverter gate is implemented as a logic gate, which is an example of the standard cell 10 described with reference to FIG. 1. FIG. 8A is a circuit diagram of the AO21A1AI2 circuit, and FIG. 8B schematically shows layouts of a standard cell 10E corresponding to the AO21A1AI2 circuit on the plane formed of the X axis and the Y axis. FIG. 8B shows an example of a layout where a 4-driver circuit is implemented.

Referring to FIGS. 8A and 8B, the first to fourth input signals A0, A1, B0, and C0 may be input to and the output signal Y may be output from the AO21A1AI2 circuit. The AO21A1AI2 circuit may include first to fourth P-type transistor units P1" to P4" to which the first to fourth input signals A0, A1, B0, and C0 are input, respectively, and first to fourth N-type transistor units N1" to N4" to which the first to fourth input signals A0, A1, B0, and C0 are input, respectively. While it is shown in FIG. 8A that each of the first to fourth P-type transistor units P1" to P4" and the first to fourth N-type transistor units N1" to N4" is one transistor, this is for convenience of illustration, and each of the first to fourth P-type transistor units P1" to P4" and the first to fourth N-type transistor units N1" to N4" may include a plurality of transistors connected in parallel.

According to a function of the AO21A1AI2 circuit, when at least one of the first input signal A0 and the second input signal A1 is logic low, and the third input signal B0 is logic low, the AO21A1AI2 circuit may output the output signal Y of logic high, or when the fourth input signal C0 is logic low, the AO21A1AI2 circuit may output the output signal Y of logic high.

The standard cell 10E defined by a cell boundary may be a multi-height cell arranged in the first row R1 and the second row R2. The standard cell 10E may receive the ground voltage VSS from the first power line PL1, and may receive the power voltage VDD from the second power line PL2.

The standard cell 10E may include a first circuit region 10_1E arranged in the first row R1 and a second circuit region 10_2E arranged in the second row R2. The first circuit region 10_1E may be symmetric with respect to the center line CL passing through the center of the standard cell 10E and being parallel to the Y-axis direction, and the second circuit region 10_2E may be symmetric with respect to the center line CL. In this case, the symmetry may indicate that arrangements of transistors included in the first circuit region 10_1E are symmetric with respect to each other, and arrangements of transistors included in the second circuit region 10_2E are symmetric with respect to each other.

The standard cell 10E may include first to fourth input pins IP11E, IP12E, IP21E, and IP22E to which the first to fourth input signals A0, A1, B0, and C0 are input, and an output pin OPE from which the output signal Y is output. The first input pin IP to which the first input signal A0 is input and the second input pin IP12E to which the second input signal A1 is input may be formed in the first circuit region 10_1E, and the third input pin IP21E to which the third input signal B0 is input and the fourth input pin IP22E to which the fourth input signal C0 is input may be formed in the second circuit region 10_2E. In the standard cell 10E, a 4-driver circuit may be implemented, and each of the first to fourth input pins IP11E, IP12E, IP21E, and IP22E may contact four first vias V0 and may be connected to four gate lines.

The first and second P-type transistor units P1" and P2" and the first and second N-type transistor units N1" and N2" may be formed in the first circuit region 10_1E, and the third and fourth P-type transistor units P3" and P4" and the third and fourth N-type transistor units N3" and N4" may be formed in the second circuit region 10_2E. In the standard cell 10E, each of the first to fourth P-type transistor units P1" to P4" and the first to fourth N-type transistor units N1' to N4' may be formed to include four transistors that are connected in parallel. For example, a function unit for performing a NAND operation on the first and second input signals A0 and A1 may be formed in the first circuit region 10_1E, and a function unit for performing the NAND operation on the third and fourth input signals B0 and C0 may be formed in the second circuit region 10_2E.

In an example embodiment, the first to fourth input pins IP11E, IP12E, IP21E, and IP22E may be formed in the first metal layer M1, and the output pin OPE may be formed in the second metal layer M2. In addition, to electrically connect internal components of the standard cell 10E, that is, for internal routing, the standard cell 10E may include patterns formed in the first metal layer M1 or the second metal layer M2.

In the standard cell 10E, the plurality of M1 tracks in which patterns of the first metal layer M1 are arranged may be formed. In each of the plurality of M1 tracks, a conductive pattern extending in the X-axis direction may be formed. The patterns of the first metal layer M1 formed in the standard cell 10E according to an example embodiment may be formed as a single pattern in a corresponding track among the plurality of M1 tracks.

A first node NC of the AO21A1AI2 circuit may be formed by extended active contacts ECE formed across the first row R1 and the second row R2, the first vias V0 contacting the extended active contacts ECE, and a pattern CM1E of the first metal layer M1 contacting the first vias V0. Thus, the first circuit region 10_1E and the second circuit region 10_2E may be electrically connected by the extended active contacts ECE formed across the first row R1 and the second row R2. As shown, the pattern CM1E of the first metal layer M1 implementing the first node NC inside the AO21A1AI2 circuit may be formed in the first circuit region 10_1E. However, example embodiments are not limited thereto, and the pattern CM1E of the first metal layer M1 implementing the first node NC inside the AO21A1AI2 circuit may be formed in the second circuit region 10_2E.

A second node ND of the AO21A1AI2 circuit may be formed by a pattern CM2 formed across the first row R1 and the second row R2, second vias V1 contacting the pattern CM2, and patterns CM11 and CM12 of the first metal layer M1 contacting the second vias V1. Thus, the first circuit region 10_1E and the second circuit region 10_2E may be electrically connected by the pattern CM2 of the second metal layer M2 formed across the first row R1 and the second row R2.

In the first circuit region 10_1E and the second circuit region 10_2E, gate lines extending in the Y-axis direction may be formed. In an example embodiment, gate lines of the first circuit region 10_1E may be formed in the first row R1, and gate lines of the second circuit region 10_2E may be formed in the second row R2.

Figure 9:
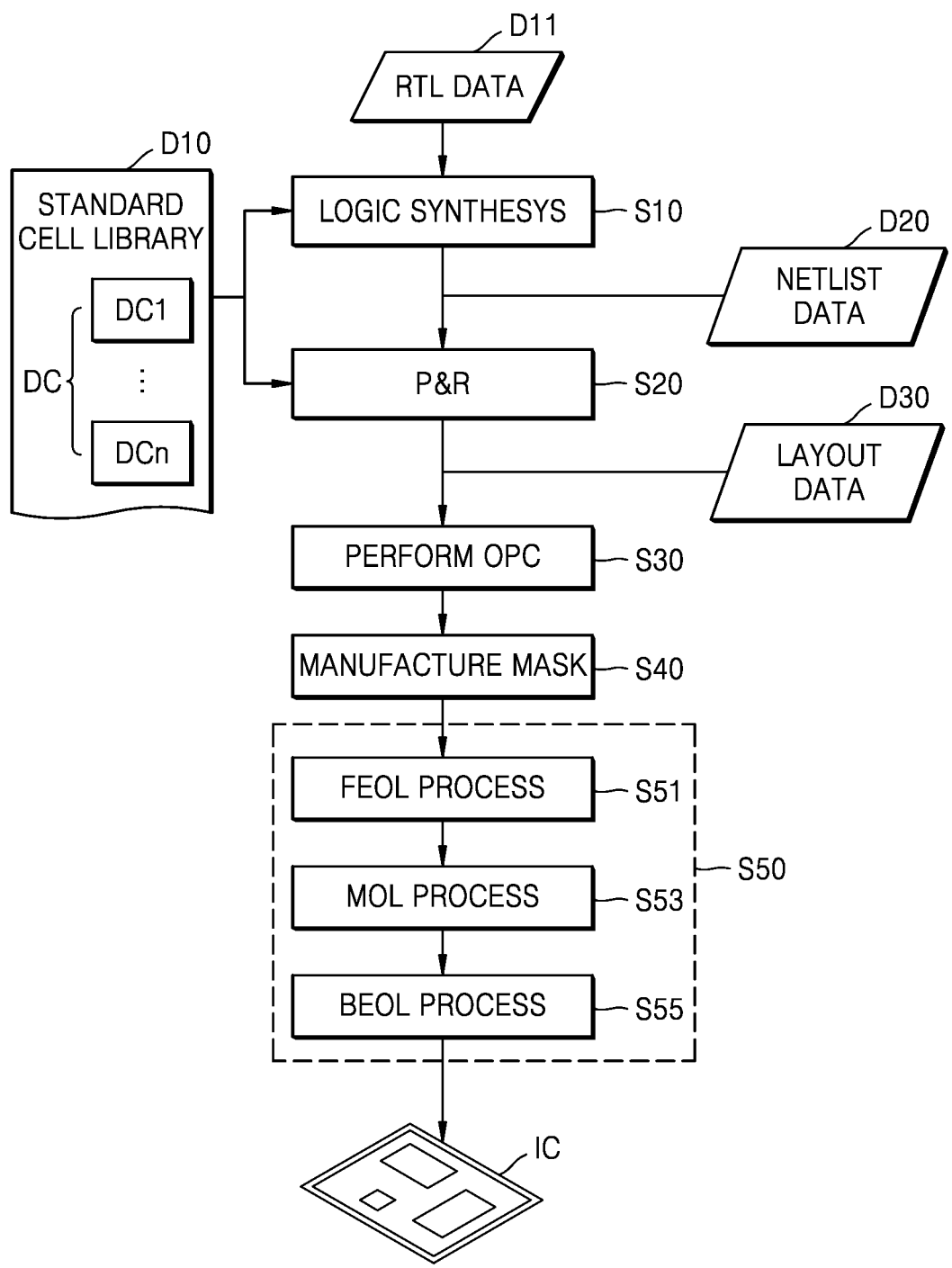
FIG. 9 is a flowchart of a method of fabricating an IC according to an example embodiment.

FIG. 9 is a flowchart showing a method of fabricating an IC according to an example embodiment.

Referring to FIG. 9, a standard cell library D10 may include information about standard cells, e.g., function information, feature information, layout information, etc. The standard cell library D10 may include data DC that defines a layout of a standard cell. The data DC may include data that defines a structure of standard cells that perform the same function and have different layouts. The data DC may include data that defines a structure of the standard cells 10 and 10A to 10E described with reference to FIGS. 1 to 8B. The data DC may include first to nth data DC1 to DCn that respectively define structures of multi-height standard cells including a first circuit region and a second circuit region which are arranged in a first row and a second row respectively and each of which is formed symmetric in the Y-axis direction.

Operations S10 and S20 are operations of designing an IC where layout data D30 may be generated from register transfer level (RTL) data D11. The IC may be the IC 1 of FIG. 1. In operation S10, a logic synthesis operation of generating netlist data D20 from the RTL data D11 may be formed. For example, a semiconductor design tool (e.g., a logic synthesis module) may generate the netlist data D20 including a bitstream or a netlist by performing logic synthesis with reference to the standard cell library D10 from the RTL data D11 generated as a hardware description language (HDL) such as a very high-speed integrated circuit (VHSIC) hardware description language (VHDL) and Verilog. The standard cell library D10 may include the data DC that defines a structure of standard cells performing the same function and having different layouts, and the standard cells may be included in an IC by referring to such information in a logic synthesis process.

In operation S20, a placement and routing (P&R) operation to generate layout data D30 from the netlist data D20 may be performed. The layout data D30 may have a format such as, for example, graphic design system (GDS)-II, and may include geometric information of standard cells and interconnections.

For example, a semiconductor design tool (e.g., a P&R module) may place a plurality of standard cells by referring to the standard cell library D10 from the netlist data D20. The semiconductor design tool may select one of layouts of standard cells defined by a netlist, and place the selected layout of the standard cells. In operation S20, at least one of the standard cells 10 and 10A to 10E described with reference to FIGS. 1 to 8B may be arranged.

In operation S20, an operation of generating interconnections may be further performed. The interconnection may electrically connect an output pin and an input pin of a standard cell, and may include, for example, a conductive pattern formed in at least one via and at least one metal layer. For example, at least one of the standard cells 10 and 10A to 10E described with reference to FIGS. 1 to 8B may be arranged, and interconnections for electrically connecting to adjacent other standard cells may be formed. A method of designing an IC according to example embodiments may optimize routing and improve the operating performance of standard cells, as a routing space for interconnecting a standard cell with another standard cell is secured.

In operation S30, optical proximity correction (OPC) may be performed. The OPC may refer to an operation of forming a pattern of a desired shape by correcting a distortion phenomenon such as refraction, etc., caused by the characteristics of light in photolithography included in a semiconductor process for fabricating an IC, and a pattern on a mask may be determined by applying OPC to the layout data D30. In an example embodiment, the layout of the IC may be limitedly changed in operation S30, and the limitedly changing of the IC in operation S30 may be referred to as design polishing as post-processing for optimizing a structure of the IC.

In operation S40, an operation of manufacturing a mask may be performed. For example, to form patterns in a plurality of layers, patterns on the mask may be defined by the application of OPC to the layout data D30, and at least one mask (or photomask) for forming patterns for each of the plurality of layers may be manufactured.

In operation S50, the IC many be fabricated. For example, by using the at least one mask manufactured in operation S40, the plurality of layers may be patterned, thus manufacturing the IC. Operation S50 may include operations S51, S53, and S55.

In operation S51, an FEOL process may be performed. The FEOL may refer to a process of forming individual elements, e.g., a transistor, a capacitor, a resistor, etc., on a substrate in a process of fabricating the IC. For example, the FEOL may include an operation of planarizing and cleaning a wafer, an operation of forming a trench, an operation of forming a well, an operation of forming a gate line, an operation of forming a source/drain region, etc.

In operation S53, the MOL process may be performed. The MOL process may refer to a process of forming a connection member for connecting the individual elements, generated by the FEOL process, in a standard cell. For example, the MOL process may include an operation of forming an active contact on an active region, an operation of forming a gate contact on a gate line, an operation of forming a first via on the active contact and the gate line, etc.

In operation S55, the BEOL process may be performed. The BEOL process may refer to a process of interconnecting the individual elements, e.g., a transistor, a capacitor, a resistor, etc., in a process of fabricating the IC. For example, the BEOL process may include an operation of silicidating gate, source, and drain regions, an operation of adding a dielectric, a planarization operation, an operation of forming a hole, an operation of forming metal layers, an operation of forming a via between metal layers, an operation of forming a passivation layer, etc.

For example, in operation S55, input pins and output pins of the standard cells 10 and 10A to 10E described with reference to FIGS. 1 to 8B may be formed, and conductive patterns for electrically connecting the standard cells 10 and 10A to 10E described with reference to FIGS. 1 to 8B with other standard cells may be formed.

In the next operation, the IC may be packaged in a semiconductor package, and may be used as a part of various applications.

Figure 10:
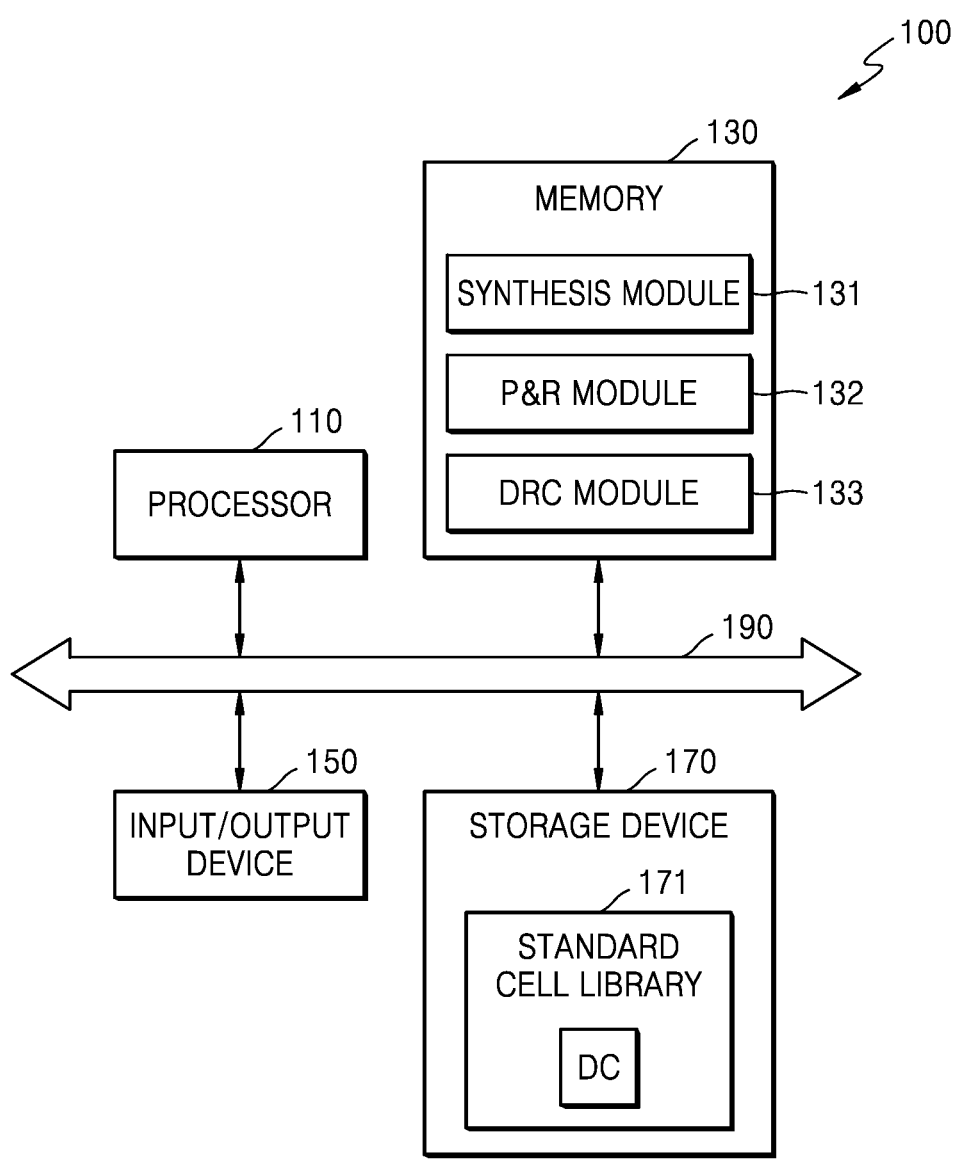
FIG. 10 is a block diagram of a computing system including a memory that stores a program according to an example embodiment.

FIG. 10 is a block diagram of a computing system for designing an IC, according to an example embodiment.

Referring to FIG. 10, a computing system (hereinafter, referred to as an 'IC design system') 100 for designing an IC may include a processor 110, a memory 130, an input/output device 150, a storage device 170, and a bus 190. The IC design system 100 may perform an IC designing operation including operations S10 and S20 of FIG. 9. In an example embodiment, the IC design system 100 may be implemented as an integrated device and thus may be referred to as an IC design apparatus. The IC design system 100 may be provided as a dedicated apparatus for designing an IC of a semiconductor device, and may also be a computer for driving various simulation tools or design tools. The IC design system 100 may be a stationary computing system such as a desktop computer, a workstation, a server, etc., or portable computing system such as a laptop computer, etc.

The processor 110 may be configured to execute instructions for executing at least one of various operations for designing the IC. For example, the processor 110 may include a core capable of executing an instruction set (e.g., Intel Architecture-32 (IA-32), 64-bit extended IA-32, x86-64, PowerPC, Sparc, MIPS, ARM, IA-64, etc.), such as a micro-processor, an application processor (AP), a digital signal processor (DSP), and a graphic processing unit (GPU). The processor 110 may communicate with the memory 130, the input/output device 150, and the storage device 170 through the bus 190. The processor 110 may perform an IC designing operation by driving a synthesis module 131 and a P&R module 132 loaded in the memory 130.

The memory 130 may store the synthesis module 131 and the P&R module 132. The synthesis module 131 and the P&R module 132 may be loaded in the memory 130 from the storage device 170. The synthesis module 131 may be a program including a plurality of instructions for executing, for example, the logic synthesis operation based on operation S10 of FIG. 9. The P&R module 132 may be a program including a plurality of instructions for executing, for example, the layout designing operation based on operation S20 of FIG. 9. The memory 130 may further include other modules, e.g., a design rule check (DRC) module 133, etc.

The memory 130 may be a volatile memory such as static random-access memory (SRAM) or dynamic RAM (DRAM), or a non-volatile memory such as a phase change RAM (PRAM), resistive RAM (ReRAM), nano floating gate memory (NFGM), polymer random access memory (PoRAM), magnetic RAM (MRAM), ferroelectric RAM (FRAM), flash memory, etc.

The input/output device 150 may control user input and output from user interface devices. For example, the input/output device 150 may include an input device such as a keyboard, a mouse, a touch pad, etc., to receive input data, etc., that defines an IC. For example, the input/output device 150 may include an output device such as a display, a speaker, etc., to display an arrangement result, a routing result, layout data, etc.

The storage device 170 may store a program such as the synthesis module 131, the P&R module 132, etc., in which before the program is executed by the processor 110, the program or at least a part thereof may be loaded in the memory 130 from the storage device 170. The storage device 170 may store data to be processed by the processor 110 or data processed by the processor 110. For example, the storage device 170 may store data to be processed by the program such as the synthesis module 131, the P&R module 132, etc., (e.g., the standard cell library 171, the netlist data, etc.) and data generated by the program (e.g., the layout data, etc.). The standard cell library 171 stored in the storage device 170 may be the standard cell library D10 of FIG. 9.

For example, the storage device 170 may include non-volatile memory such as electrically erasable programmable read-only memory (EEPROM), flash memory, PRAM, ReRAM, MRAM, FRAM, etc., and a storage medium such as a memory card (a multimedia card (MMC), an embedded MMC (eMMC), secure digital (SD), MicroSD, etc.) solid state drive (SSD), hard disk drive (HDD), a magnetic tape, an optical disk, and a magnetic disk. Further, the storage device 170 may be removable from the IC design system 100.

While aspects of example embodiments have been particularly shown and described, it will be understood that various changes in form and details may be made therein without departing from the spirit and scope of the following claims.

What is claimed is:

1. A standard cell provided in a first row and a second row, each extending in a first horizontal direction, the standard cell comprising:
    a first circuit region provided in the first row and comprising a plurality of first transistors;
    a second circuit region provided in the second row and comprising a plurality of second transistors;
    a first input pin provided in the first circuit region and configured to receive a first input signal; and
    a second input pin provided in the second circuit region and configured to receive a second input signal,
    wherein the first input signal is input to gate terminals of each of the plurality of first transistors, and the second input signal is input to gate terminals of each of the plurality of second transistors;
    wherein the first circuit region is symmetric with respect to a second horizontal direction and the second circuit region is symmetric with respect to the second horizontal direction,
    wherein the second circuit region and the first circuit region are arranged along the second horizontal direction, and
    wherein a power line extends in the first horizontal direction between the first circuit region and the second circuit region.

2. The standard cell of claim 1, wherein the first circuit region and the second circuit region each comprise gate lines, and
    wherein the gate lines of the first circuit region are separated from the gate lines of the second circuit region.

3. The standard cell of claim 1, further comprising an extended active contact that extends from an active region of the first circuit region to an active region of the second circuit region, and contacts the active region of the first circuit region and the active region of the second circuit region.

4. The standard cell of claim 3, wherein a metal layer pattern connected to the extended active contact is formed on the extended active contact and a corresponding one of the first circuit region and the second circuit region.

5. The standard cell of claim 1, wherein the plurality of first transistors comprise four first P-type transistors and four first N-type transistors, and
    wherein the plurality of second transistors comprise four second P-type transistors and four second N-type transistors.

6. The standard cell of claim 1, wherein the plurality of first transistors comprise two first P-type transistors and two first N-type transistors, and
    wherein the plurality of second transistors comprise two second P-type transistors and two second N-type transistors.

7. The standard cell of claim 1, further comprising a first metal layer and a second metal layer formed in the first circuit region and the second circuit region,
    wherein the second metal layer is provided on the first metal layer, and
    wherein the first input pin and the second input pin are formed in the first metal layer.

8. The standard cell of claim 1, further comprising a first metal layer and a second metal layer formed in the first circuit region and the second circuit region,
    wherein the second metal layer is provided on the first metal layer, and
    wherein an output pin configured to provide an output signal to outside of the standard cell is formed in the second metal layer.

9. The standard cell of claim 1, further comprising a metal layer formed in the first circuit region and the second circuit region and comprising a plurality of tracks formed therein, each of the plurality of tracks comprising a single pattern extending in the first horizontal direction, and the plurality of tracks being separated from one another in the second horizontal direction.

10. A standard cell provided in a first row and a second row that each extend in a first horizontal direction, the standard cell comprising:
    a first circuit region provided in the first row and comprising a first function circuit formed therein, the first function circuit operating according to a first input signal;
    a second circuit region provided in the second row and comprising a second function circuit formed therein, the second function circuit operating according to a second input signal;
    a first input pin provided in the first circuit region and configured to receive the first input signal; and
    a second input pin provided in the second circuit region and configured to receive the second input signal,
    wherein the first input pin and the second input pin are formed in a first metal layer closest to the first circuit region and the second circuit region, among a plurality of metal layers,
    wherein the first circuit region is symmetric with respect to a second horizontal direction and the second circuit region is symmetric with respect to the second horizontal direction,
    wherein the second circuit region and the first circuit region are arranged along the second horizontal direction, and
    wherein a power line extends in the first horizontal direction between the first circuit region and the second circuit region.

11. The standard cell of claim 10, wherein the first circuit region and the second circuit region each comprise gate lines, and
    wherein the gate lines of the first circuit region are separated from the gate lines of the second circuit region.

12. The standard cell of claim 10, wherein the first circuit region and the second circuit region each comprise active regions, and
    wherein the standard cell further comprises an extended active contact that extends from the active region of the first circuit region to the active region of the second circuit region, and contacts the active region of the first circuit region and the active region of the second circuit region.

13. The standard cell of claim 12, further comprising a metal layer pattern that is connected to the extended active contact, formed on the extended active contact, and is provided on one of the first circuit region and the second circuit region.

14. The standard cell of claim 10, wherein each of the first input pin and the second input pin contacts four vias formed thereunder.

15. The standard cell of claim 10, wherein the first metal layer comprises a plurality of tracks formed therein, each of the plurality of tracks comprising a single pattern extending in the first horizontal direction, and the plurality of tracks being separated from one another in the second horizontal direction.

16. An integrated circuit comprising:
a plurality of standard cells provided in a plurality of rows extending in a first horizontal direction; and
a plurality of power lines arranged in boundaries of each of the plurality of rows,
wherein at least one standard cell among the plurality of standard cells comprises:
a first circuit region provided in a first row of the plurality of rows and comprising a plurality of first transistors;
a second circuit region provided in a second row of the plurality of rows and comprising a plurality of second transistors;
a first input pin provided in the first circuit region and configured to receive a first input signal; and
a second input pin provided in the second circuit region and configured to receive a second input signal,
wherein one of the plurality of power lines extends in the first horizontal direction between the first circuit region and the second circuit region,
wherein the first input signal is applied to gate terminals of each of the plurality of first transistors, and the second input signal is applied to gate terminals of each of the plurality of second transistors, and
wherein the first circuit region is symmetric with respect to a second horizontal direction and the second circuit region is symmetric with respect to the second horizontal direction.

17. The IC of claim 16, wherein the plurality of first transistors comprises n first P-type transistors and n first N-type transistors, and the plurality of second transistors comprises n second P-type transistors and n second N-type transistors, and
wherein n is an even number.

18. The IC of claim 16, further comprising a first metal layer and a second metal layer sequentially stacked,
wherein the first input pin and the second input pin are formed in the first metal layer.

19. The IC of claim 16, wherein the first circuit region and the second circuit region each comprise gate lines formed as a gate pattern provided in corresponding one of the first row and the second row.

20. The IC of claim 16, wherein the first circuit region and the second circuit region each comprise active regions, and
wherein the at least one standard cell further comprises an extended active contact that extends from the active region of the first circuit region to the active region of the second circuit region, and contacts the active region of the first circuit region and the active region of the second circuit region.

* * * * *